(12) United States Patent
Meyer et al.

(10) Patent No.: US 11,429,570 B2
(45) Date of Patent: Aug. 30, 2022

(54) BATCH DATA IMPORT ADVANCE MAPPING

(71) Applicant: salesforce.com, inc., San Francisco, CA (US)

(72) Inventors: Alison Meyer, San Francisco, CA (US); Patrick Tewson, San Francisco, CA (US); Charles Allen, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/985,989

(22) Filed: Aug. 5, 2020

(65) Prior Publication Data
US 2021/0240676 A1  Aug. 5, 2021

Related U.S. Application Data

(60) Provisional application No. 62/968,791, filed on Jan. 31, 2020.

(51) Int. Cl.
  *G06F 16/21*  (2019.01)
  *G06F 16/22*  (2019.01)
  *G06F 16/25*  (2019.01)
  *G06F 16/242*  (2019.01)

(52) U.S. Cl.
  CPC ........ *G06F 16/213* (2019.01); *G06F 16/2282* (2019.01); *G06F 16/2423* (2019.01); *G06F 16/258* (2019.01)

(58) Field of Classification Search
  CPC .. G06F 16/213; G06F 16/2282; G06F 16/258; G06F 16/2423
  See application file for complete search history.

(56) References Cited

U.S. PATENT DOCUMENTS

| | | | |
|---|---|---|---|
| 10,423,639 B1 * | 9/2019 | Kapoor | G06F 16/254 |
| 11,120,512 B1 * | 9/2021 | Dutt | G06F 40/186 |
| 2017/0011135 A1 * | 1/2017 | Srivastava | G06F 16/258 |
| 2017/0116295 A1 * | 4/2017 | Wan | G06F 16/254 |
| 2018/0218052 A1 * | 8/2018 | Cosgrove, Jr. | G06F 16/254 |
| 2020/0159746 A1 * | 5/2020 | Suriarachchi | G06F 16/2379 |
| 2021/0124713 A1 * | 4/2021 | Dain | G06F 3/0685 |

* cited by examiner

*Primary Examiner* — Dangelino N Gortayo
(74) *Attorney, Agent, or Firm* — Sterne, Kessler, Goldstein & Fox P.L.L.C.

(57) ABSTRACT

A method for batch data import using advance matching. The method includes: generating a target field for a custom object in an application including a plurality of objects; configuring a data import object with a custom staging field; generating a custom object group for the custom object specifying a parent/child relationship between the custom object and a standard object of the plurality of objects; generating, after generating the custom object group, a field mapping between the custom staging field and the target field in the custom object; and storing the field mapping between the custom staging field and the target field.

20 Claims, 7 Drawing Sheets

Custom Object GUI
400

Fields & Relationships
5 Items, Sorted by Field Label

| FIELD LABEL | FIELD NAME | DATA TYPE |
|---|---|---|
| Created By | CreatedById | Lookup(User) |
| Last Modified By | LastModifiedById | Lookup(User) |
| Owner | OwnerId | Lookup(User,Group) |
| Survey Date | Survey_Date__c | Date |
| Survey Name | Name | Text(80) |

Survey Date Field
444

FIG. 4

BATCH DATA IMPORT ADVANCE MAPPING

CROSS-REFERENCE TO RELATED APPLICATIONS

This application is a non-provisional application of U.S. Provisional Patent Application Ser. No. 62/968,791, entitled: "Batch Data Import Advance Mapping," which filed on Jan. 31, 2020. Accordingly, this application claims priority to U.S. Provisional Patent Application Ser. No. 62/968,791 under 35 U.S.C. § 119(e). U.S. Provisional Patent Application Ser. No. 62/968,791 is hereby incorporated by reference in its entirety.

BACKGROUND

Individuals and organizations (e.g., corporations, non-profits, governments, academic institutions, etc.) are often required to store and maintain large quantities of data from many different sources. It is not uncommon for these individuals and organizations to rely upon third-party data management systems for their needs. Although these third-party data management systems come with standard tables and fields that can be utilized, these individuals and organizations often have specific data management needs that arise from the custom data they are maintaining and utilizing. Accordingly, individuals and organizations wish to customize these third-party data management systems to handle their custom and specific needs.

BRIEF DESCRIPTION OF THE DRAWINGS/FIGURES

The accompanying drawings are incorporated herein and form a part of the specification.

FIG. 4 shows an example of a GUI for adding a target field to a custom object in accordance with one or more embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and computer program product (e.g., non-transitory computer readable media) embodiments that allow individuals and organizations ("licensees") to customize a third-party data management system for their specific needs. The data management system includes standard objects with standard fields. However, the data management system is configured to generate custom objects with fields to store and manage custom data (e.g., data that falls outside of what the standard objects would store). Further, the data management system includes a data import object that may be configured with custom staging fields for loading the custom data (e.g., from a file) obtained by the licensee. Further still, the data management system may be configured to generate object groups storing mappings between the custom staging fields in data import object and the fields in the custom objects where the custom data is to be eventually stored and managed ("target fields"). These field mappings are utilized when the data is being imported into the data management system.

Figure 1:
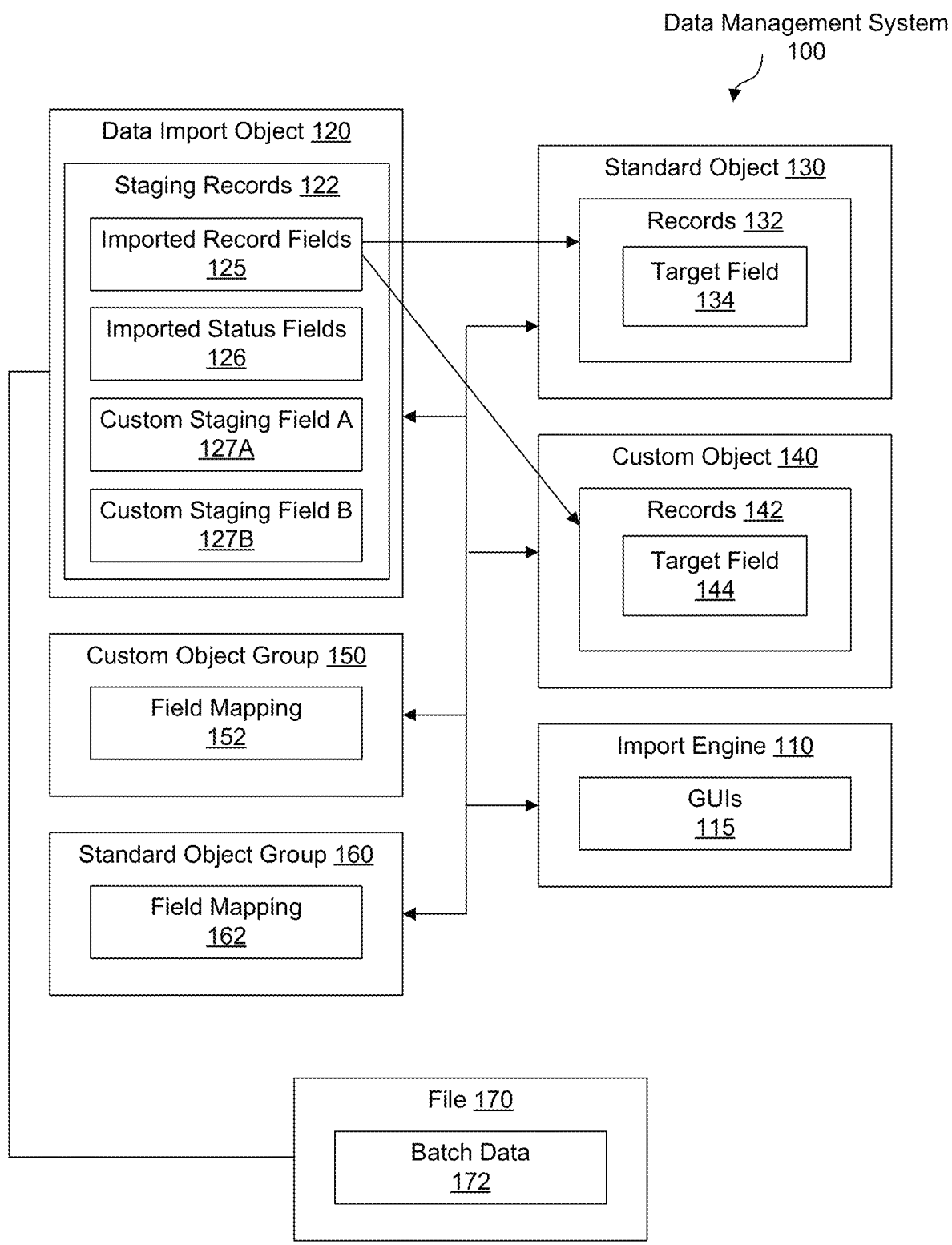
FIG. 1 shows a block diagram of a data management system in accordance with one or more embodiments.

FIG. 1 shows a data management system 100 in accordance with one or more embodiments. As shown in FIG. 1, the data management system 100 has multiple components including an import engine 110, a data import object 120, at least one standard object 130, at least one custom object 140, a custom object group 150, and a standard object group 160. Each of these components (110, 120, 130, 140, 150, 160) may exist on a single computing device (e.g., server, mainframe, personal computer (PC), laptop, tablet PC, smartphone, etc.). Alternatively, these components (110, 120, 130, 140, 150, 160) may be spread across multiple computing devices connected by one or more networks having wired and/or wireless segments.

The one or more standard objects 130 and one or more custom objects 140 may form at least part of a database. Further, the data management system 100 may be a component of a larger application (e.g., email application, customer relationship management application, non-profit/charity management application, social media application, image processing application, word processing application, encryption application, web browser, etc.).

In one or more embodiments, the standard object 130 is an object that comes with the data management system 100. Specifically, once populated, the standard object 130 stores records 132 having a set of fields that come pre-defined with the data management system 100. For example, the standard object 130 may be a contacts object. In this example, each of the records 132 corresponds to a different contact and the pre-defined fields may include first name, last name, birthday, email, phone number, street address, etc. As another example, the standard object 130 may be an accounts object. In this example, each of the records 132 corresponds to a different account and the pre-defined fields may include account name, account age, account size, account owner, account revenue, etc. As yet another example, the standard object 130 may be an opportunity object. In this example, each of the records 132 corresponds to a different opportunity and the pre-defined fields may include amount, stage, close date, etc. The standard object 130 may be considered a table with rows corresponding to the records 132 and columns corresponding to the predefined fields. Although FIG. 1 only shows a single standard object 130, the data management system 100 may have multiple standard objects and a record in one standard object may be linked with one or more records in other standard objects. Moreover, there may multiple standard objects of the same type (e.g., two contacts objects).

In one or more embodiments, the custom object 140 is an object that has been generated by or for the licensee during or following installation of the data management system 100. In other words, the custom object 140 does not come with the data management system and is specific to the licensee. In general, once populated, the custom object 140 stores records 142 with fields that are custom for the licensee. These fields store data that falls outside of what would be stored by the one or more standard objects 130. For example, the target object 140 may be a survey object. In this example, each of the records 142 correspond to a different survey and the fields may include survey name, survey date, survey participant, etc. Like the standard object 130, the custom object 140 may be considered a table with rows corresponding to the records 142 and columns corresponding to the fields. Although FIG. 1 only shows a single custom object 140, the data management system 100 may have multiple custom objects.

In one or more embodiments, each custom object 140 has a parent/child relationship with one or more of the standard objects 130. If the custom object 140 is a child of the standard object 130, one of the fields in the custom object 140 connects to the records 132 of the standard object 130. For example, in the case of the survey custom object and the contacts standard object, the survey participant field of the survey object may connect to the records of the contacts object. If the custom object 140 is a parent of the standard object 130, one of the fields in the standard object 130 connects to the records 142 of the custom object 140.

In one or more embodiments, the file 170 includes batch data 172 for populating and/or updating the records 132 in the standard objects 130 and the records 142 in the target objects 140. The batch data 172 may have been obtained by the licensee from one or more sources. The batch data 172 may be organized into rows and columns. Each row in the batch data 172 may correspond to a single entity and each column in the batch data 172 may correspond to one of the fields in the standard objects 130 or one of the fields in the custom objects 140. In one or more embodiments, the file 170 may be a command-separated values (CSV) file. The file 170 may also be referred to as a template.

In one or more embodiments, the data import object 120 is an object that comes with the data management system 100. The data import object 120 includes staging records 122 with fields corresponding to the columns in the file 170. The data import object 120 is configured to load the batch data 172 from the file 170 into the staging records 122. The fields in the staging records 122 may be an aggregation of all the fields in the standard objects 130 and the custom objects 140. During the importation process, the data in the staging records 122 is used to generate/update records in the standard objects 130 and the custom objects 140. Specifically, the data in different fields in the staging records 122 may end up in different objects (e.g., standard objects 130, custom objects 140) in newly generated or updated records. In other words, the data import object 120 includes fields that correspond to fields in the standard objects 130 or custom objects 140. If new fields are added to standard objects 130 or custom objects 140, corresponding new fields may be added to the data import object 120. The names and data types of the new fields in the data import object 120 correspond to, and possibly match, the names and data types of the new fields in the standard objects 130 or custom objects 140.

In one or more embodiments, each of the staging records 122 has one or more imported record fields 125. Following processing of the batch data 172, each imported record field 125 is populated with a pointer to a record that was generated or updated based on the data in the staging record. For example, if the data in a single staging record is used to generate a record in the standard object 130 and a record in the custom object 140, the single staging record would have two imported record fields 125. One of the imported record fields 125 would be populated with a reference to the generated record in the custom object 140, while the other imported record field 125 would be populated a reference to the generated record in the standard object 130.

In one or more embodiments, each of the staging records 122 has one or more imported status fields 126. An imported status field 126 may exist for each imported record field 125. In other words, the imported status field 126 and the imported record field 125 may always exist together. The number of imported status fields 126 in a single staging record depends on the number of records across the standard objects 130 and the custom objects 140 that will be generated or updated with the data from the single staging record. Following importation of the batch data 172, each imported status field 126 is populated with the status (e.g., success, fail, failure due to incorrect permissions, failure due to invalid data, etc.) of generating/updating one of the records based on the data in the staging record. For example, if the data in a single staging record is used to generate a record in the standard object 130 and a record in the custom object 140, the single staging record would have two imported status fields 126. One of the imported status fields 126 would be populated with the status of the generated record in the custom object 140, while the other imported status field 126 would be populated the status of the generated record in the standard object 130.

As discussed above, the batch data 172 may include custom data that the licensee wishes to store and manage in the data management system 100. The data management system 100 may generate a target field 144 in the custom object 140 for storing the custom data from the batch data 172. The data management system 100 may also configure the data import object 120 with a custom staging field 127A for loading the custom data from the batch data 172.

In one or more embodiments, the custom object group 150 stores (e.g., in metadata) a field mapping 152 that links the custom staging field 127A to the target field 144. As a result, following the importation process, the data in the custom staging field 127 A will end up in the target field 144. The custom object group 150 may store other field mappings between fields in the staging records 122 and the fields in the records 142 of the custom object 140 for the importation process. Further, although not shown in FIG. 1, the custom object group 150 may also store the parent/child relationship between the custom object 140 and the standard object 130, discussed above. It is this parent/child relationship specified in the custom object group 150 that is used to create relationships between records in the custom object 140 and records in other objects (e.g., standard object 130) after processing. Further still, the custom object group 150 may specify the identity of the imported record field 125 and the imported status field 126 associated with the custom object 140. The imported record field 125 and the imported status field 126 are populated during/following the importation process because they are identified in the custom object group 150. Although FIG. 1 only shows one custom object group 150, there may be one custom object group 150 for each custom object 140.

Although the embodiments disclosed have focused on storing custom data in a target field 144 of the custom object 140, it is also possible to store custom data in a target field 134 of a standard object 130. Moreover, the application might not come with mappings for some standard objects 130. However, it is possible to add mappings for such standard objects 130 during or following installation of the application. The data management system 100 may generate a target field 134 in the standard object 130 for storing the custom data from the batch data 172. The data management system 100 may also configure the data import object 120 with a custom staging field 127B for loading the custom data from the batch data 172. In such embodiments, the standard object group 160 stores (e.g., in metadata) a field mapping 162 that links the custom staging field 127B to the target field 134. As a result, following the importation process, the data in the custom staging field 127 B will end up in the target field 134. The standard object group 160 may store other field mappings between fields in the staging records 122 and the fields in the records 132 of the standard object 130 for the importation process. Although FIG. 1 only shows one standard object group 160, there may be one standard object group 160 for each standard object 130.

Alternatively, the custom staging field B 127B may include a help line attribute that specifies the target field 134. This is a legacy mapping that enabled custom data in the custom staging field B 127B to be stored in the target field 134 following this importation process. The data management system 100 may be configured to remove this legacy mapping and replace it with the field mapping 162 in the standard object group 160. In other words, the data management system 100 is also configured to act as a migration tool for legacy custom mappings to target fields 134 in the standard objects 130.

In one or more embodiments, the import engine 110 is configured to generate the target fields 134 of the standard objects 130 and the target fields 144 of the custom objects 140. Further, the import engine 110 may also configure the data import object 122 with the custom staging fields 127, the imported record fields 125, and the imported status fields 126. Further still, the import engine 110 may generate the custom object group 150 with the field mapping 152 and the standard object group 160 with the field mapping 162. The import engine 110 may execute these operations based on user instructions and parameters received via one or more graphical user interfaces (GUIs) 115.

In one or more embodiments, during the importation process, the import engine 110 may load the batch data 172 into the staging records 122. As part of this loading process, the custom data in the batch data 172 may be stored in the custom staging fields 127 (e.g., columns in the file 170 may correspond to fields in the staging records). The import engine 110 may also generate/update records 132 in the standard object 130 and generate/update records 142 in the custom object 140 based on the staging records 122. As part of this record generation/updating, and based on the field mapping 152 and the field mapping 162, the custom data in the custom staging fields 127 may end up in the target fields 134 or target fields 144 of the newly generated/updated records. As also part of this record generation/updating, and based on the contents of the custom object group 150 and the standard object group 160 (e.g., specified parent/child relationships, etc.), the newly generated/updated records may be linked to other records in other objects. In one or more embodiments, the import engine 110 is configured to populate the imported status fields 126 and the imported record fields 125, as discussed above.

Figure 2:
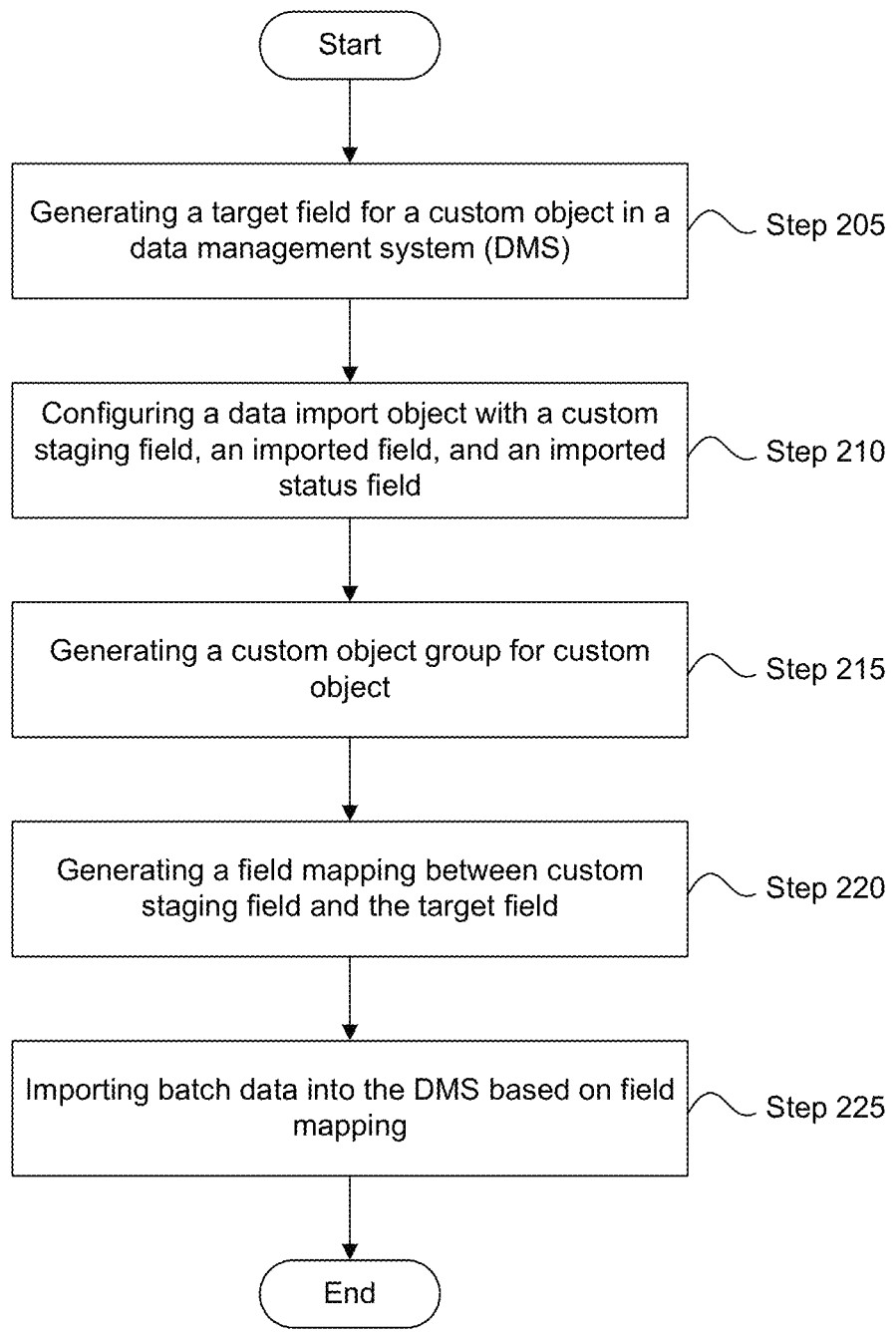
FIG. 2 shows a flowchart for generating a new field mapping in accordance with one or more embodiments.

FIG. 2 shows a flowchart in accordance with one or more embodiments. The process in FIG. 2 may be executed by the import engine 110 interacting with one or more of the other components (120, 130, 140, 150, 160, 170) of the data management system 100, discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In Step 205, a target field is generated in a custom object of the data management system. As discussed above, the custom object is an object that has been generated by or for the licensee during or following installation of the data management system. In other words, the custom object does not come with the data management system. The target field is being generated to eventually store custom data obtained by the licensee. The custom object may eventually have one or more records, with each record having the target field. Generating the target field may include obtaining a label for the target field, a name for the target field, a type of the target field (e.g., text, date, numeric, etc.).

In Step 210, the data import object of the data management system is configured with a custom staging field to be associated with the target field of the custom object. The data import object may eventually have one or more staging records, with each staging record having the custom staging field. The custom staging field is configured to store the custom data when batch data that includes the custom data is loaded into the staging records. The data import object may also be configured with an imported record field and an imported status field, discussed above.

In Step 215, a custom object group for the custom object is generated. The custom object group specifies the parent/child relationship between the custom object and one of the standard objects (i.e., objects that come with the data management system). The custom object group also specifies the field in the custom object that connects to the records of the standard object, when the custom object is a child of the standard object. The custom object group also specifies the field in the standard object that connects to records of the custom object, when the custom object is a parent of the standard object. The custom object group may also specify the identities of the imported record field and the imported status field in the data import object associated with the custom object.

In one or more embodiments, if custom object group already exists for the custom object, step 215 may be omitted and there is no need to configure the data import object with the imported record field or import status field as it has already been done.

In Step 220, a field mapping is generated between the custom staging field in the data import object and the target field in the custom object. Generating the mapping is now possible because the custom object group has been generated. The field mapping may be stored (e.g., as metadata) in the target group object. In one or more embodiments, the field mapping is generated through the use of a GUI (e.g., new field mapping GUI 600, discussed below) that only presents unmapped fields (to prevent mapping twice to the same target field). Further, for a selected custom staging field, the GUI might only show unmapped target fields with data types that are compatible with the data type of the selected custom staging field (to ensure data from the staging records can write to the target fields without error).

In Step 225, batch data may be imported into the data management system. As discussed above, the batch data may include the custom data and may be stored in a file (e.g., a CSV file) as rows and columns. The batch data may be loaded from the file and into staging records of the data import object. A row in the file may correspond to a single staging record. The fields of the staging records may correspond to the columns in the file. The custom staging field (from Step 210) of the staging records corresponds to the column in the file with the custom data. Accordingly, following this loading process, the custom data in each row in the file will be stored in the custom staging field of each staging record.

Then, one or more records in the custom object(s) and the standard object(s) may be generated/updated based on the staging records and the field mappings. Specifically, a single staging record may trigger a record to be generated/updated in multiple standard objects and custom objects. The data in different fields of a single staging record may end up stored in different records across the multiple standard objects and custom objects. Specifically, the custom data in the custom staging field of a staging record will end up stored in the target field of a record in the custom object, as specified in the field mapping from Step 220. Further, links/connections between records in different objects may also be generated based on the parent/child relationships. Further still, the imported status fields and the imported record fields may be updated, as discussed above.

Those skilled in the art, having the benefit of this detailed description, will appreciate that if the file has multiple columns of custom data, steps 205-220 may be repeated multiple times to generate multiple target fields for storing all the custom data.

Figure 3:
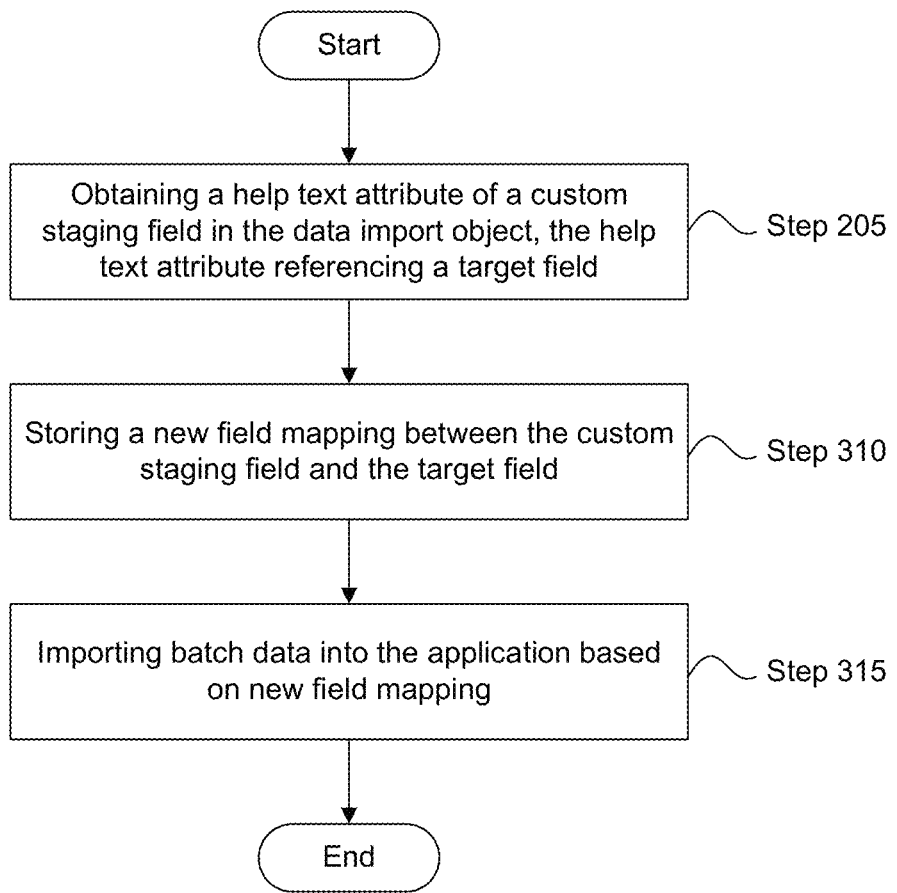
FIG. 3 shows a flowchart for migrating a legacy custom mapping in accordance with one or more embodiments.

FIG. 3 shows a flowchart in accordance with one or more embodiments. The process in FIG. 3 may be executed by the import engine 110 interacting with one or more of the other components (120, 130, 140, 150, 160, 170) of the data management system 100, discussed above in reference to FIG. 1. In one or more embodiments, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In Step 305, a help text attribute of a custom staging field in the data import object is obtained. The help text attribute may be obtained by accessing the custom staging field. The help text attribute may reference a custom target field in a standard object (e.g., target field 134 in standard object 130). This help text attribute referencing the target field is a legacy mapping that enabled custom data in the custom staging field to eventually be stored in the target field 134 of the standard object 130.

In Step 310, a new field mapping between the custom staging field and the target field in the standard object, as specified by the help text attribute, is generated. This new field mapping will replace the legacy mapping involving the help text attribute. It is effectively a migration from the legacy system. This new field mapping may be stored in the standard object group for the standard object (e.g., standard object group 162).

In Step 315, batch data may be imported into the data management system. As discussed above, the batch data may include the custom data and may be stored in a file (e.g., a CSV file) as rows and columns. The batch data may be loaded from the file and into staging records of the data import object. A row in the file may correspond to a single staging record. The fields of the staging records may correspond to the columns in the file. The custom staging field (from Step 305) of the staging records corresponds to the column in the file with the custom data. Accordingly, following this loading process, the custom data in each row in the file will be stored in the custom staging field of each staging record.

Then, one or more records in the standard object may be generated/updated based on the staging records and the new field mapping. Specifically, a single staging record may trigger a record to be generated/updated in the standard object based on the new field mapping. The data in different fields of a single staging record may end up stored in different records across the multiple staging objects and custom objects. Specifically, the custom data in the custom staging field of a staging record will end up stored in the target field of a record in the standard object, as specified in the field mapping from Step 310. Further, links/connections between records in different objects may also be generated based on the parent/child relationships. Those skilled in the art, having the benefit of this detailed description, will appreciate that because the new field mapping exists, the legacy mapping that utilizes the help text attribute is no longer required.

Those skilled in the art, having the benefit of this detailed description, will appreciate that steps 305 and 310 may be executed in parallel with some of the steps in FIG. 2. Moreover, step 315 may be merged into step 225. In such embodiments, the new field mapping (from Step 310) may be utilized in step 225 to map custom staging fields to target fields including target fields in a standard object.

As discussed above, the batch data 172 may include custom data that the licensee wishes to store and manage in the data management system 100. The data management system 100 may generate a target field 144 in the custom object 140 for storing the custom data from the batch data 172. The data management system 100 may also configure the data import object 120 with a custom staging field 127A for loading the custom data from the batch data 172.

Figure 5:
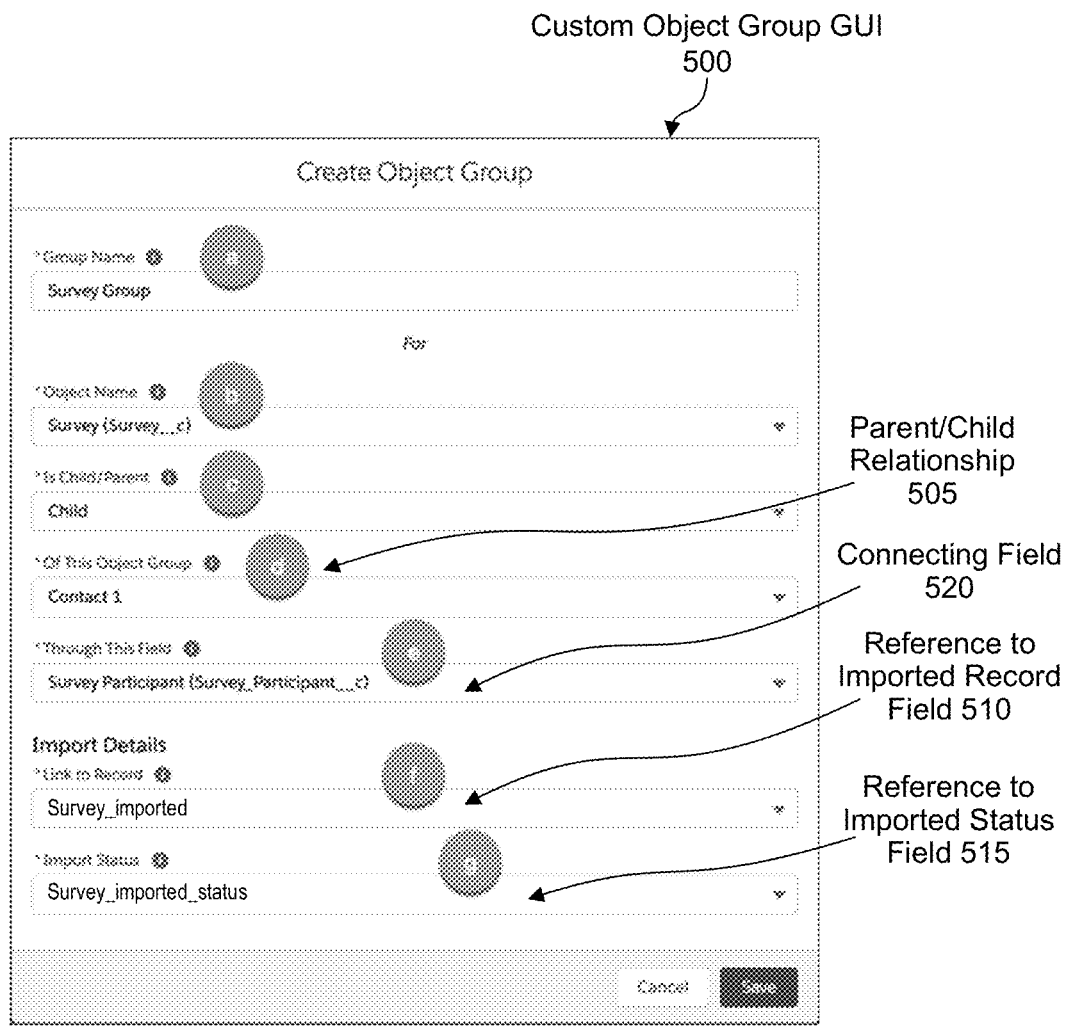
FIG. 5 shows an example of a GUI for generating a new custom object group in accordance with one or more embodiments.
Figure 6:
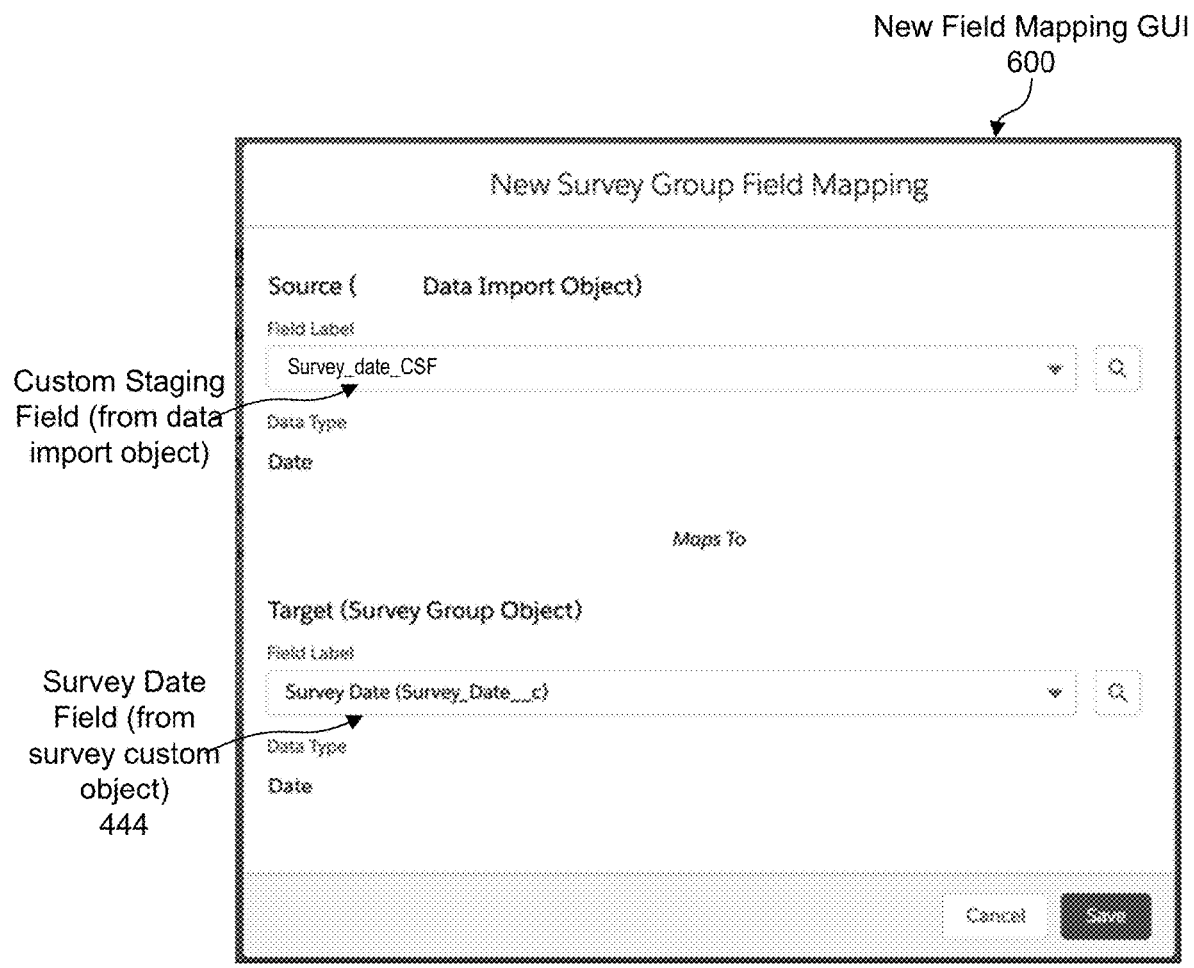
FIG. 6 shows an example of a GUI for generating new field mapping in accordance with one or more embodiments.

FIG. 4, FIG. 5, and FIG. 6 show an example(s) in accordance with one or more embodiments. In this example, assume that the data management system has a contacts standard object (e.g., standard object 130) and a survey custom object (e.g., custom object 140). The survey custom object is a child of the contacts standard object. Each record in the survey custom object corresponds to a survey. The licensee wishes to generate a survey date field (e.g., target field 144) in each record of the survey custom object to store the date (e.g., custom data from file 170) that the survey associated with the record took place.

FIG. 4 shows a custom object GUI 400. The custom object GUI 400 may be one of the GUIs 115, discussed above in reference to FIG. 1. The custom object GUI 400 is being used to generate the survey date field 444 for the survey custom object. As shown, the survey date field 444 has a name, a label, and a data type.

Following generation of the survey data field 444, the licensee may configure the data import object with a custom staging field (CSF) (e.g., custom staging field A 127A) called survey_date_CSF to eventually be linked with the survey date field 444 in the survey custom object, an imported status field (e.g., imported status field 126) called survey_imported_status associated with the survey custom object, and an imported record field (e.g., imported record field 125) called survey_imported associated with the survey custom object.

FIG. 5 shows a custom object group GUI 500. The custom object group GUI 500 may be one of the GUIs 115, discussed above in reference to FIG. 1. The custom object group GUI 500 is used to generate a custom object group (e.g., custom object group 150) for the survey custom object. As shown in FIG. 5, the target object GUI is being used to specify the parent/child relationship 505 between the survey custom object and the contacts standard object (i.e., the survey custom object is a child of the contacts standard object). Further, the target object GUI 500 is being used to specify the field in the custom survey object 520 that links/connects to the records of the contacts standard objects (i.e., survey participant field). Further still, the target object GUI 500 is being used to reference the imported record field 510 (e.g., survey_imported) and the imported status field 515 (e.g., survey_imported_status) associated with the survey custom object and located in the data import object.

FIG. 6 shows a new field mapping GUI 600. The new field mapping GUI 600 may be one of the GUIs 115, discussed above in reference to FIG. 1. The new field mapping GUI 600 is being used to generate a field mapping between the custom staging field (i.e., survey_date_CSF) in the data import object and the survey date field 444 in the survey custom object. This new field mapping may be stored in the custom object group.

Assume the file with batch data (e.g., file 170) has a column corresponding to survey dates. During the importation process, the batch data will be loaded into the staging records of the data import object. This includes loading the survey dates into the custom staging field (i.e., survey_date_CSF) of the staging records. Then, one or more records in the survey target object will be generated/updated based on the staging records. As part of this record generating/updating, and because of the field mapping generated in FIG. 6, the survey dates in the custom staging field (i.e., survey_date_CSF) of the staging records will be stored in the survey field 444 of the records in the survey custom object.

Figure 7:
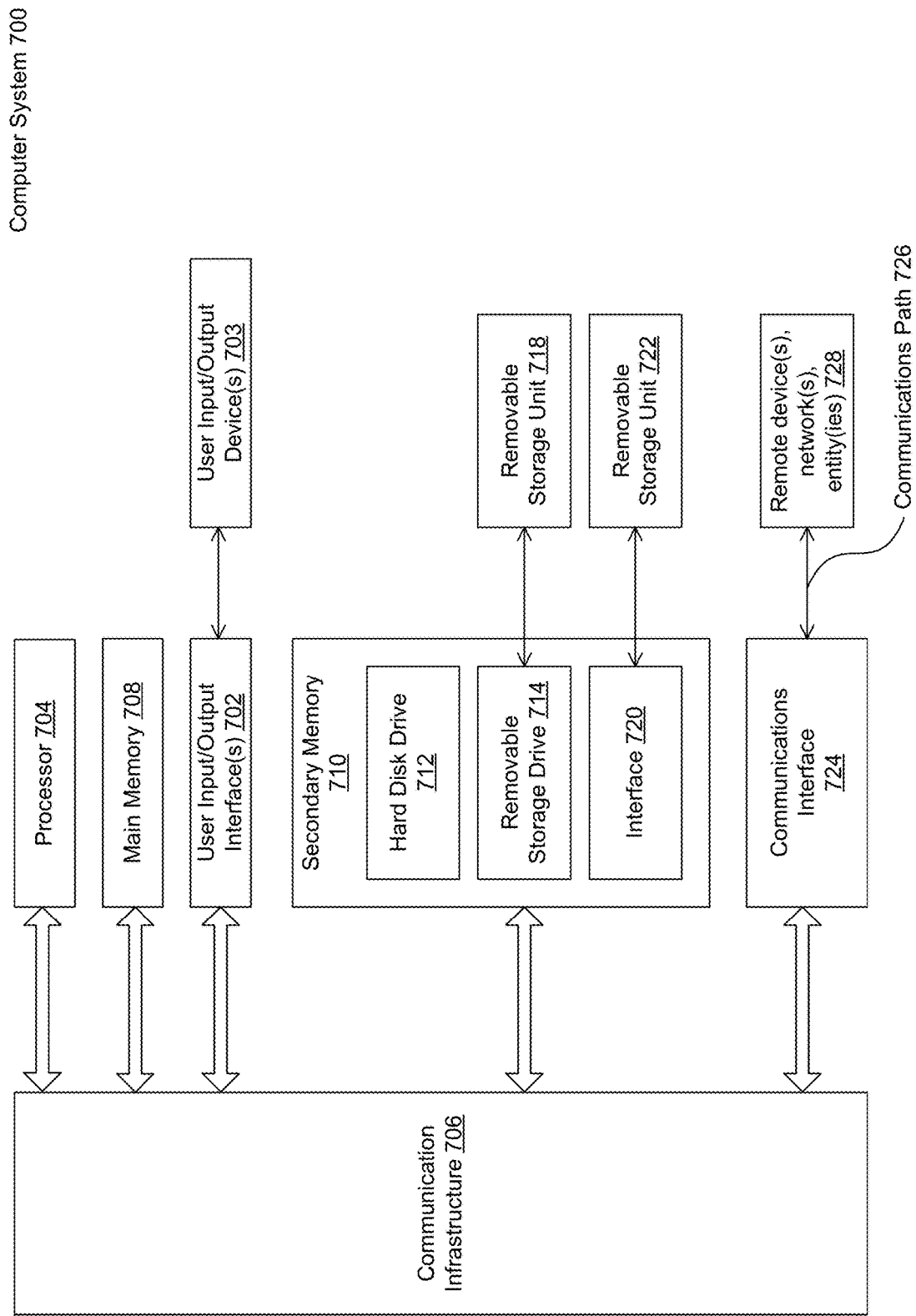
FIG. 7 shows an example computer system useful for implementing various embodiments.

Various embodiments can be implemented, for example, using one or more computer systems, such as computer system 700 shown in FIG. 7. Computer system 700 can be used, for example, to implement the processes shown in FIG. 2 and FIG. 3. Computer system 700 can also be used to implement the GUIs shown in FIG. 4, FIG. 5, and FIG. 6. For example, computer system 700 can be configured to generate a new field mapping in a data management system and/or migrate a legacy custom mapping. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   generating a target field for a custom object in an application comprising a plurality of objects;
   configuring a data import object with a custom staging field;
   generating a custom object group for the custom object specifying a parent/child relationship between the custom object and a standard object of the plurality of objects;
   generating, after generating the custom object group, a field mapping between the custom staging field and the target field in the custom object group, wherein the field mapping comprises records of the parent/child relationship;
   storing the field mapping between the custom staging field and the target field and the parent/child relationship, in the custom object group; and
   importing data into the custom object in the application based on the data corresponding to the records of the parent/child relationship in the field mapping.

2. The method of claim 1, further comprising:
   loading the data from a file into a plurality of staging records of the data import object comprising the custom staging field;
   generating, based on the field mapping and the plurality of staging records, a first set of records in the custom object comprising the target field; and
   generating, based on the plurality of staging records, a second set of records in the standard object.

3. The method of claim 2, wherein the file is a comma-separated values (CSV) file comprising a column corresponding to the custom staging field.

4. The method of claim 2, wherein the custom object group further specifies a field of the first set of records linking the first set of records to the second set of records based on the parent/child relationship.

5. The method of claim 2, further comprising:
   accessing a help text attribute of another custom staging field in the data import object, wherein the help text attribute references another target field; and
   storing another field mapping between the another custom staging field and the another target field,
   wherein the plurality of staging records further comprises the another custom staging field.

6. The method of claim 5, wherein:
   the another target field is for the standard object,
   the second set of records comprises the another target field,
   the another field mapping is stored in an object group associated with the standard object, and
   generating the second set of records is further based on the another field mapping.

7. The method of claim 1, further comprising:
   configuring the data import object with an import status field and an imported record field associated with the custom object,
   wherein the custom object group identifies the import status field and the imported record field in the data import object.

8. The method of claim 1, wherein the plurality of objects comprises an accounts object and an opportunity object, and wherein the standard object is a contacts object.

9. A system, comprising:
   one or more computer processors; and
   a memory storing instructions that when executed by the one or more computer processors, cause the one or more computer processors to:
   generate a target field for a custom object in an application comprising a plurality of objects;
   configure a data import object with a custom staging field;
   generate a custom object group for the custom object specifying a parent/child relationship between the custom object and a standard object of the plurality of objects;
   generate, after the custom object group is generated, a field mapping between the custom staging field and the target field in the custom object group, wherein the field mapping comprises records of the parent/child relationship;
   store the field mapping between the custom staging field and the target field and the parent/child relationship, in the custom object group; and
   import data into the custom object in the application based on the data corresponding to the records of the parent/child relationship in the field mapping.

10. The system of claim 9, wherein the instructions further cause the one or more computer processors to:
    load the data from a file into a plurality of staging records of the data import object comprising the custom staging field;
    generate, based on the field mapping and the plurality of staging records, a first set of records in the custom object comprising the target field; and
    generate, based on the plurality of staging records, a second set of records in the standard object.

11. The system of claim 10, wherein the file is a comma-separated values (CSV) file comprising a column corresponding to the custom staging field.

12. The system of claim 10, wherein the custom object group further specifies a field of the first set of records linking the first set of records to the second set of records based on the parent/child relationship.

13. The system of claim 10, wherein the instructions further cause the one or more computer processors to:
    access a help text attribute of another custom staging field in the data import object, wherein the help text attribute references another target field; and
    store another field mapping between the another custom staging field and the another target field, wherein the plurality of staging records further comprises the another custom staging field.

14. The system of claim 13, wherein:
the another target field is for the standard object,
the second set of records comprises the another target field,
the another field mapping is stored in an object group associated with the standard object, and
generating the second set of records is further based on the another field mapping.

15. The system of claim 9, wherein the instructions further cause the one or more computer processors to:
configure the data import object with an import status field and an imported record field associated with the custom object,
wherein the custom object group identifies the import status field and the imported record field in the data import object.

16. A non-transitory computer readable medium (CRM) storing instructions that when executed by one or more computer processors, cause the one or more computer processors to:
generate a target field for a custom object in an application comprising a plurality of objects;
configure a data import object with a custom staging field;
generate a custom object group for the custom object specifying a parent/child relationship between the custom object and a standard object of the plurality of objects;
generate, after the custom object group is generated, a field mapping between the custom staging field and the target field in the custom object group, wherein the field mapping comprises records of the parent/child relationship;
store the field mapping between the custom staging field and the target field and the parent/child relationship, in the custom object group; and
import data into the custom object in the application based on the data corresponding to the records of the parent/child relationship in the field mapping.

17. The non-transitory CRM of claim 16, wherein the instructions further cause the one or more computer processors to:
load the data from a file into a plurality of staging records of the data import object comprising the custom staging field;
generate, based on the field mapping and the plurality of staging records, a first set of records in the custom object comprising the target field; and
generate, based on the plurality of staging records, a second set of records in the standard object.

18. The non-transitory CRM of claim 17, wherein the custom object group further specifies a field of the first set of records linking the first set of records to the second set of records based on the parent/child relationship.

19. The non-transitory CRM of claim 17, wherein the instructions further cause the one or more computer processors to:
access a help text attribute of another custom staging field in the data import object, wherein the help text attribute references another target field; and
store another field mapping between the another custom staging field and the another target field,
wherein the plurality of staging records further comprises the another custom staging field.

20. The non-transitory CRM of claim 19, wherein:
the another target field is for the standard object,
the second set of records comprises the another target field,
the another field mapping is stored in an object group associated with the standard object, and
generate the second set of records is further based on the another field mapping.

* * * * *